United States Patent Office 3,444,181
Patented May 13, 1969

3,444,181
ISOINDOLES
William J. Houlihan, Mountain Lakes, N.J.,
assignor to Sandoz Inc.
No Drawing. Filed Mar. 23, 1967, Ser. No. 625,298
Int. Cl. C07d 49/34, 31/40, 49/30
U.S. Cl. 260—309.6                               2 Claims

ABSTRACT OF THE DISCLOSURE

The compounds are of the classes (1) 5-hydroxy-5-heterocyclic - 2,3 - dihydro-5H-imidazo[2,1-a]isoindoles, (2) 6 - hydroxy - 6 - heterocyclic - 3,4 - dihydro-2H,6H-pyrimido[2,1-a]isoindoles and (3) 7-hydroxy-7-heterocyclic - 2,3,4,5 - tetrahydro - 7H - [1,3]diazepino[2,1-a]isoindoles, which are useful as anorectic agents.

---

This invention relates to tricyclic compounds. In particular, the invention pertains to 5-hydroxy-5-heterocyclic-2,3 - dihydro-5H-imidazo[2,1-a]isoindoles, 6-hydroxy-6-heterocyclic - 3,4 - dihydro-2H,6H-pyrimido[2,1-a]isoindoles and 7-hydroxy-7-heterocyclic-2,3,4,5-tetrahydro-7H-[1,3]diazepino[2,1-a]isoindoles and a process for preparing the same.

The isoindoles of the present invention may be represented structurally as follows:

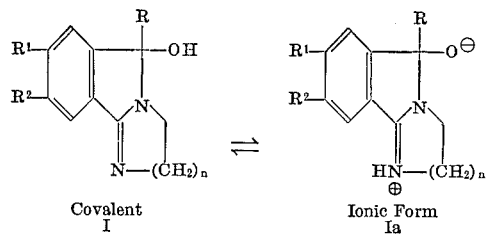

Covalent         Ionic Form
   I                  Ia wherein:
R represents thienyl(2-or 3-); or pyridyl (2-, 3- or 4-);
each of $R^1$ and $R^2$ is, independently, hydrogen; or chloro; and
$n$ represents a whole number of from 1 to 3, inclusive.

As representative of the compounds encompassed within the scope of this invention there may be mentioned:
5-hydroxy-5-5(3-thienyl)-2,3-dihydro-5H-imidazo[2,1-a]isoindole
7-chloro-5-hydroxy-5-(2-thienyl)-2,3-dihydro-5H-imidazo[2,1-a]isoindole
7,8-dichloro-5-hydroxy-5-(2-thienyl)-2,3-dihydro-5H-imidazo[2,1-a]isoindole
5-hydroxy-5-(2-pyridyl)-2,3-dihydro-5H-imidazo[2,1-a]isoindole
8-chloro-5-hydroxy-5-(3-pyridyl)-2,3-dihydro-5H-imidazo[2,1-a]isoindole
7,8-dichloro-5-hydroxy-5-(4-pyridyl)-2,3-dihydro-5H-imidazo[2,1-a]isoindole
6-hydroxy-6-(3-thienyl)-3,4-dihydro-2H,6H-pyrimido[2,1-a]isoindole
8-chloro-6-hydroxy-6-(2-thienyl)-3,4-dihydro-2H,6H-pyrimido[2,1-a]isoindole
8,9-dichloro-6-hydroxy-6-(2-thienyl)-3,4-dihydro-2H,6H-pyrimido[2,1-a]isoindole
6-hydroxy-6-(2-pyridyl)-3,4-dihydro-2H,6H-pyrimido[2,1-a]isoindole
9-chloro-6-hydroxy-6-(3-pyridyl)-3,4-dihydro-2H,6H-pyrimido[2,1-a]isoindole
8,9-dichloro-6-hydroxy-6-(4-pyridyl)-3,4-dihydro-2H,6H-pyrimido[2,1-a]isoindole
7-hydroxy-7-(3-thienyl)-2,3,4,5-tetrahydro-7H-[1,3]diazepino[2,1-a]isoindole
9-chloro-7-hydroxy-7-(2-thienyl)-2,3,4,5-tetrahydro-7H-[1,3]diazepino[2,1-a]isoindole
9,10-dichloro-7-hydroxy-7-(2-thienyl)-2,3,4,5-tetrahydro-7H-[1,3]diazepino[2,1-a]isoindole
7-hydroxy-7-(2-pyridyl)-2,3,4,5-tetrahydro-2H-[1,3]diazepino[2,1-a]isoindole
10-chloro-7-hydroxy-7-(3-pyridyl)-2,3,4,5-tetrahydro-7H-[1,3]diazepino[2,1-a]isoindole
9,10-dichloro-7-hydroxy-7-(4-pyridyl)-2,3,4,5-tetrahydro-7H-[1,3]diazepino[2,1-a]isoindole The above Compounds I are prepared by isomerizing an appropriate isoindolone by treating the latter with lithium aluminum hydride as illustrated by the following reaction scheme:

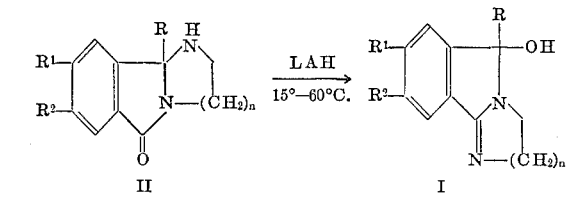

wherein R, $R^1$, $R^2$ and $n$ are as previously defined.

The isomerization is carried out in an inert ether solvent, preferably diethyl ether or tetrahydrofuran, employing lithium aluminum hydride as the isomerizing agent. The temperature at which the reaction is carried out is critical and should not exceed about 60° C. Preferably, the reaction is carried out at a temperature of from about 15° C. to about 35° C.

Various of the starting Compounds II employed in the above process and their preparation have been described in the literature (see, e.g., Netherlands Patent No. 6,501,647, published Aug. 12, 1965). Such others which are not specifically described in the literature can be prepared in analogous manner.

The compounds of Formula I are useful because they possess pharmacological activity in animals. In particular, the compounds possess both appetite depressant activity and mild central nervous system stimulant activity and accordingly can be used as anorexigenic agents and mild phychic energizers. For such uses, the compounds may be combined with a pharmaceutically acceptable carrier, and such other adjuvants as may be necessary, and administered orally in such forms as tablets, capsules, elixirs, suspensions and the like or parenterally in the form of an injectable solution or suspension. Furthermore, the compounds may be similarly adminstered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrobromide, hydrochloride, sulfate, phosphate and the like and the organic acid salts such as the succinate, benzoate, acetate, maleate, p-toluenesulfonate, benzenesulfonate and the like.

For the above-mentioned uses, the dosage administered will, of course, vary depending upon the compound employed and the mode of administration. However, in general, satisfactory results are obtained when administered at a daily dosage of from about 10 to about 25 milligrams per kilogram of animal body weight, preferably given in divided doses 2 to 4 times a day, or in sustained release form. For most mammals, the daily dosage is generally in the range of from about 50 milligrams to about 250 milligrams and dosage forms suitable for internal administration comprises from about 12.5 milligrams to about 125 milligrams of the compound admixed with a solid or liquid pharmaceutical carrier or diluent.

A representative formulation is a tablet (prepared by standard tabletting techniques) and containing the following ingredients:

| | Parts by weight |
|---|---|
| 5-hydroxy-5-(2-thienyl)-2,3-dihydro-5H-imidazo[2,1-a]isoindole | 25 |
| Tragacanth | 2 |
| Lactose | 64.5 |
| Corn starch | 5 |
| Talcum | 3 |
| Magnesium stearate | 0.5 |

The following example shows a representative compound encompassed within the scope of this invention and the manner in which said compound is prepared. However, it is to be understood that the example is for the purpose of illustration only and is not intended as in any way limiting the scope of the invention which is defined in the appended claims.

EXAMPLE 5-hydroxy-5-(2-thienyl)-2,3-dihydro-5H-imidazo[2,1-a]isoindole

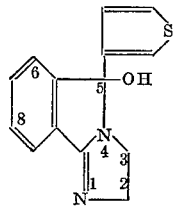

To a flask equipped with a stirrer, thermometer, dropping funnel, condenser and gas inlet tube, and blanketed with nitrogen, is added 500 ml. of dry tetrahydrofuran and 3.1 g. of lithium aluminum hydride. The mixture is stirred and then a solution of 19.5 g. of 9b-(2-thienyl)-1,2,3,9b-tetrahydro-5H-imidazo[2,1-a]isoindol - 5 - one in 250 ml. of dry tetrahydrofuran is added dropwise such that the temperature of the reaction mixture does not exceed 30° C. The resulting mixture is stirred for 6 hours at room temperature (20°–25° C.), then cooled in an ice bath and then treated with 6.2 ml. of 2 N sodium hydroxide and 9.3 ml. of water. The resulting mixture is filtered and the filtrate dried by the addition of solid anhydrous sodium sulfate. The sodium sulfate is then filtered off and the filtrate evaporated in vacuo on a rotary evaporator. The residue is crystallized from tetrahydrofuran-diethyl ether (1:1) to obtain 5-hydroxy-5-(2-thienyl)-2,3-dihydro-5H-imidazo[2,1-a]isoindole, M.P. 152–155° C.

What is claimed is:

1. A compound selected from the group consisting of isoindoles of the formula

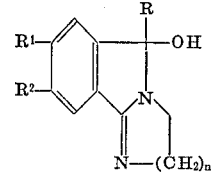

or a non-toxic acid addition salt thereof, wherein:

R represents

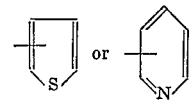

each of $R^1$ and $R^2$ is, idependently, hydrogen or chloro; and n represents a whole number of from 1 to 3, inclusive.

2. 5-hydroxy-5-(2-thienyl)-2,3-dihydro - 5H - imidazo[2,1-a]isoindole.

References Cited

Geigy Chem. Abst. vol. 64, columns 6664–5 (1966).

HENRY R. JILES, Primary Examiner.

NATALIE TROUSOF, Assistant Examiner.

U.S. Cl. X.R.

260—251, 296, 326.5, 999; 424—273